Jan. 26, 1932. J. E. G. GEISEL 1,843,025
COMBINATION FIRE TONGS AND POKER AND STOVE LID LIFTER
Filed April 14, 1931
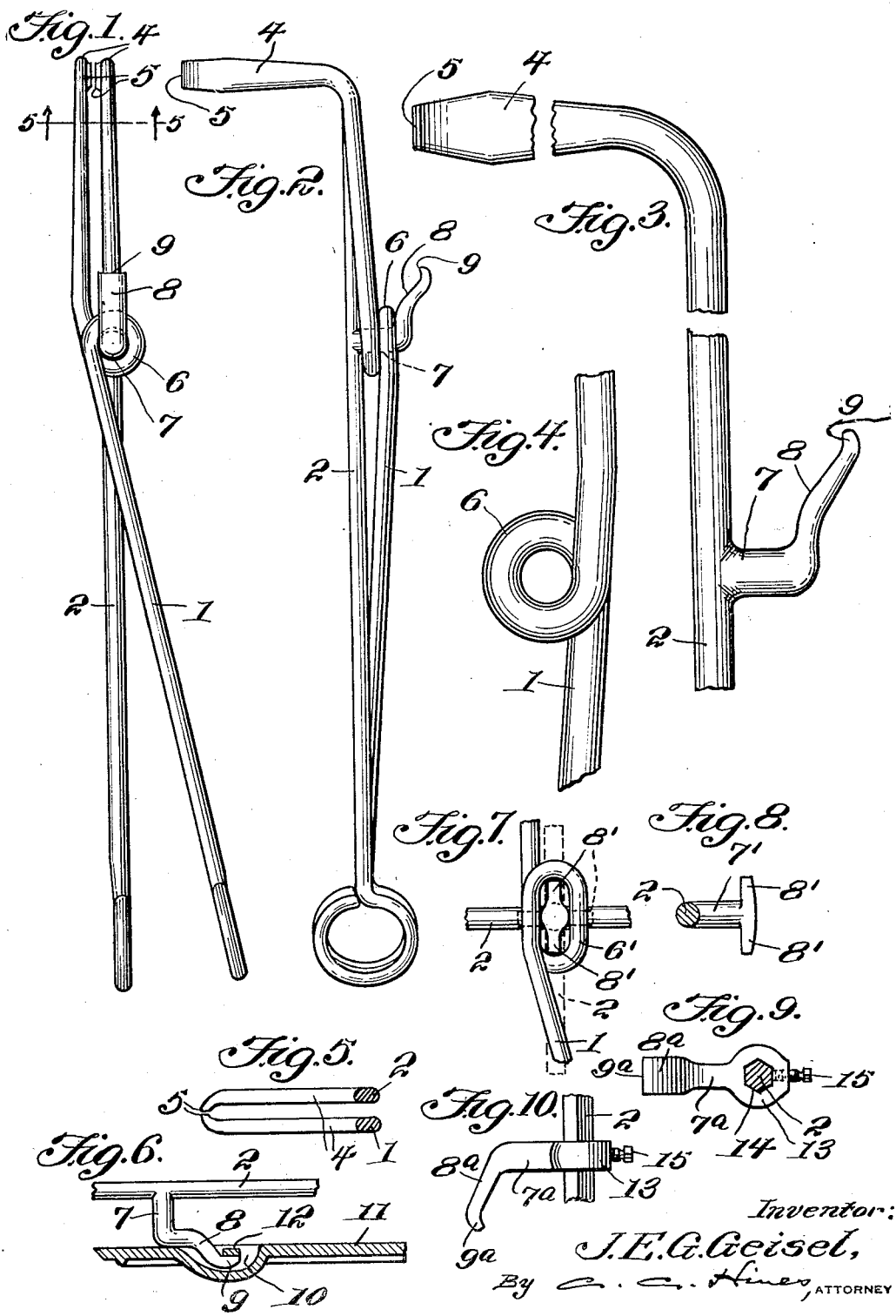
Inventor:
J. E. G. Geisel,
By C. C. Hines, ATTORNEY Patented Jan. 26, 1932

1,843,025

UNITED STATES PATENT OFFICE

JOHN E. G. GEISEL, OF LEHIGHTON, PENNSYLVANIA

COMBINATION FIRE TONGS AND POKER AND STOVE LID LIFTER

Application filed April 14, 1931. Serial No. 530,098.

This invention relates to a combination implement especially adapted for use in connection with open fires and stoves, and the object of the invention is to provide an implement of this character embodying a pair of poker elements forming the jaws of tongs, one of said members having a pivot eye and the other member a pivot pin or stem to engage said eye, whereby the jaws are pivotally and detachably connected, the said pivot pin or stem being so formed as to serve as a stove lid lifter, whereby a convenient combination implement of the character set forth is produced.

The invention consists of the features of construction, combination and arrangement of parts, hereinafter fully described and claimed, reference being had to the accompanying drawings, in which:—

Fig. 1 is a top plan view of an implement embodying my invention, showing the jaws or poker elements as pivotally connected to form a pair of tongs.

Fig. 2 is a side elevation of the device shown in Fig. 1.

Figs. 3 and 4 are, respectively, fragmentary views of the two jaws or poker elements.

Fig. 5 is a cross-section on the line 5—5 of Fig. 1.

Fig. 6 is a view illustrating the use of the stove lid lifter.

Figs. 7 and 8 are, respectively, fragmentary views showing a modified construction of the pivotal connection and stove lid lifter member of the implement.

Figs. 9 and 10 are top plan and side elevational views of a separately formed pivot and stove lid lifter member for attachment to one of the poker elements.

In the practical embodiment of my invention, as shown in Figs. 1 to 6, inclusive, I provide a combination implement of the character described comprising a pair of pivotally connected jaws 1 and 2, each having at one end a loop shaped manipulating handle 3 and at the other end an angularly bent arm or claw 4 terminating in a pointed stirring or raking and gripping end 5. The elements or jaws 1 and 2 are adapted to be pivotally connected for use as tongs and are designed, when disconnected, to be separately employed as pokers for use in stirring a fire or performing other similar operations, for which purpose the raker or stirrer arms or claws 4 may be made of the same or different formations so that like or specifically different stirring actions may be produced.

In order to adapt the elements 1 and 2 to be pivotally connected to form tongs, I provide the element 1 with a pivot loop or opening 6 and the element 2 with a pivot member 7 to engage said loop or opening. The member 7 forms a pivot pin or stem which engages the keeper eye or loop 6 with sufficient looseness to adapt the elements 1 and 2 to be opened and closed with a suitable degree of freedom. The member, pin or stem 7 is provided with a retaining projection 8 which operates to hold the members 6 and 7 pivotally connected and from casual disconnection, while, at the same time, allowing the jaws or elements 1 and 2 to be connected or disconnected by predetermined angular movements with relation to each other. The projection 8 is provided with an engaging tip 9 and said projection and tip are shaped to form a lid lifting member adapted, as shown in Fig. 6, to be inserted in a depression 10 in a stove lid 11 and engaged with a lifting bar or cross piece 12 therein, so that, when the element 2 is disconnected from the element 1, said element 2 may be employed as a stove lid lifter in a ready and convenient manner.

When the elements 1 and 2 are joined or pivotally connected, as shown in Figs. 1 and 2, a pair of tongs of convenient construction are provided which are capable of manipulation by means of the handles 3 for the purpose of relatively moving the arms 4 so that the points 5 thereof may be caused to grip and hold lumps of coal, slate, clinkers or other particles in feeding a fire with fuel or removing incombustibles or consumed fuel particles and performing other like operations. When the elements 1 and 2 are so combined in order to convert them into individual pokers for stirring or other purposes it is simply necessary to move them relatively to one another in such manner that parts 6 and 7 will be disconnected, whereby the elements are detached for individual use.

The form and construction of parts 6 and 7 may be varied to a considerable extent within the spirit and scope of my invention. In the present instance I have shown some of the modified constructions which may be employed. In Figs. 7 and 8, for example, the element 1 is shown as provided with an oblong eye or loop 6' for engagement with a pivot stem 7' on element 2 having at its outer end a transverse retaining projection 8' forming with the stem 7' a T-shaped lid lifter, as will be readily understood. Obviously, with this construction the elements 1 and 2 may be connected or disconnected by bringing the cross portion 8' of the pivot member and lid lifter parallel with the major axis of the loop 6', whereas by bringing the two elements 1 and 2 in operative position with the cross portion 8' extending transversely of the loop 6' the said elements will be held in such relation against casual displacement. The pivot and retaining members thus far described and shown in Figs. 1 to 8, inclusive, may be integral with the element 2, but in Figs. 9 and 10 I have shown a construction of independently formed pivot member and stove lid lifter which may be employed if desired. This member comprises a pivot stem portion 6ª having a retaining arm 8ª and engaging tip 9ª at one end and formed at its opposite end with a bracket part 13 formed with an angular opening 14 and carrying a set screw or clamping member 15. This form of independent pivot member and lid lifter is designed to be slipped over the arm 4 of member 2, with the body portion of the latter extending through the angular opening 14, and the set screw 15 is then tightened to clamp the pivot member and lifter in properly applied position. This independent pivot member and lifter will engage the loop or eye 6 and operate in the same manner as the pivot member and lifter shown in Figs. 1 to 6, inclusive.

From the foregoing description, taken in connection with the drawings, the construction, mode of operation, uses and advantages of my improved combination implement will be readily understood, and it will be seen that the invention provides an implement of this character embodying a pair of tongs, the jaws or elements of which may be disconnected to form separate and independent pokers, and the pivotal connection between which includes a pivot member having a retaining portion forming therewith a stove lid lifter. The invention, therefore, produces an implement of simple construction, which may be manufactured and sold at a comparatively low cost, and which enables a number of operations to be performed without the necessity of employing normally disconnected, separate and independent tools for the purpose.

While the constructions herein shown are preferred, it will, of course, be understood that changes in the form, proportions and details of construction of the parts of the device may be made within the scope of the invention as set forth in the appended claims, without departing from the spirit or sacrificing any of the advantages of the invention.

Having thus fully described my invention, I claim:—

1. Combined tongs, pokers and a stove lid lifter comprising a pair of poker elements forming the jaws of a pair of tongs, one of said elements having a keeper and the other of said elements having a pivot member engageable with said keeper and provided with a retaining portion, said member and retaining portion being shaped to form a stove lid lifter.

2. Combination tongs and pokers comprising a pair of individual poker elements forming the jaws of tongs, one of said elements having a keeper opening and the other of said elements having a hook-shaped pivot and retaining member engaging said keeper opening and pivotally and detachably connecting said elements together.

3. A combination implement of the character set forth in claim 1 in which the pivot opening is of oblong form and the pivot member and stove lid lifter is T-shaped.

4. A combination implement of the character set forth in claim 1 in which the combined pivot member and stove lid lifter is formed separately from and provided with means for fastening it to the jaw or poker element by which it is carried.

In testimony whereof I affix my signature.

JOHN E. G. GEISEL.